(12) United States Patent
Gavin

(10) Patent No.: US 12,528,264 B1
(45) Date of Patent: Jan. 20, 2026

(54) SMART COMPACTOR CONTROLLER

(71) Applicant: Plastic Recovery Technologies Corporation, Schaumburg, IL (US)

(72) Inventor: Kevin Paul Gavin, Schaumburg, IL (US)

(*) Notice: Subject to any disclaimer, the term of this patent is extended or adjusted under 35 U.S.C. 154(b) by 0 days.

(21) Appl. No.: 19/199,648

(22) Filed: May 6, 2025

(51) Int. Cl.
*B30B 15/26* (2006.01)
*B30B 15/00* (2006.01)
*G05B 13/02* (2006.01)

(52) U.S. Cl.
CPC .......... *B30B 15/26* (2013.01); *B30B 15/0094* (2013.01); *G05B 13/0265* (2013.01)

(58) Field of Classification Search
CPC .. B30B 15/26; B30B 15/0094; G05B 13/0265
USPC ........................................ 700/275
See application file for complete search history.

(56) References Cited

U.S. PATENT DOCUMENTS

| | | |
|---|---|---|
| 4,773,027 A | 9/1988 | Neumann |
| 6,360,186 B1 | 3/2002 | Durbin |
| 6,453,270 B1 | 9/2002 | Durbin |
| 6,687,656 B2 | 2/2004 | Durbin et al. |
| 6,738,732 B2 | 5/2004 | Durbin et al. |
| 7,481,160 B1 | 1/2009 | Simon et al. |
| 7,926,419 B1 | 4/2011 | Simon et al. |
| 8,056,817 B2 | 11/2011 | Flood |
| 8,310,367 B1* | 11/2012 | Vishwanath ....... G06K 19/0773 340/572.1 |
| 8,794,135 B1* | 8/2014 | Simon ................... B30B 9/3057 100/50 |
| 2011/0061546 A1* | 3/2011 | Correale, Jr. ......... B30B 9/3007 100/4 |
| 2016/0379154 A1* | 12/2016 | Rodoni .......... G06Q 10/063114 705/7.15 |
| 2019/0019167 A1* | 1/2019 | Candel ...................... B65F 3/14 |
| 2021/0182802 A1* | 6/2021 | Hübler ............... G06Q 10/0833 |
| 2022/0334551 A1* | 10/2022 | Sommer ............. G05B 19/406 |
| 2025/0199072 A1* | 6/2025 | Baronijan ............ G01R 31/343 |
| 2025/0238949 A1* | 7/2025 | Armstrong ................ G06T 7/20 |

\* cited by examiner

*Primary Examiner* — Thomas C Lee
*Assistant Examiner* — Michael Tang
(74) *Attorney, Agent, or Firm* — Stonebridge IP, PLLC

(57) ABSTRACT

A smart controller for a waste compactor is disclosed which includes a computer device including a display interface, a sensor array including a load sensor, a vibration sensor, a temperature sensor, and a pressure sensor, a communications module configured for wireless connectivity, wherein the smart controller is configured to monitor fullness of the waste compactor, and the smart controller is configured for diagnostics monitoring including temperature, motor strain and hydraulic leaks. Command/control of the power unit for industrial compactors is also disclosed, featuring an integrated universal artificial intelligence (AI) program that uses machine learning for optimization. The system performs all functions of operating a compactor including monitoring compactor fullness, diagnosing operational issues, internal warranty tracking calendar and AI replacement predictability in addition to end-user remote troubleshooting to minimize service calls.

11 Claims, 9 Drawing Sheets

FIG. 3

| ⊙ System Status | ⇌ Cycles | ⚙ Maintenance | 🔔 Alerts | ⇄ Connectivity | 🛠 Diagnostic Tools |

Alerts

List of alerts

| Current Status | Alert Type | Enabled | Email Enabled | Email Recipient | SMS Enabled | SMS Recipient | |
|---|---|---|---|---|---|---|---|
| OK | SYSTEM COMM | Enabled | Disabled | N/A | Disabled | N/A | ⋮ |
| OK | 80% FULLNESS | Enabled | Disabled | N/A | Disabled | N/A | ⋮ |
| OK | 100% FULLNESS | Enabled | Enabled | N/A | Disabled | N/A | ⋮ |
| OK | 80% OIL TEMP | Enabled | Disabled | N/A | Disabled | N/A | ⋮ |
| OK | 100% OIL TEMP | Enabled | Enabled | test@prtparts.com | Enabled | 555-7474 | ⋮ |
| OK | LOW OIL | Enabled | Disabled | N/A | Disabled | N/A | ⋮ |
| OK | 80% PM | Enabled | Disabled | N/A | Disabled | N/A | ⋮ |
| OK | 100% PM | Enabled | Disabled | N/A | Disabled | N/A | ⋮ |
| OK | 80% BACKPACK | Enabled | Disabled | N/A | Disabled | N/A | ⋮ |
| OK | 100% BACKPACK | Enabled | Disabled | N/A | Disabled | N/A | ⋮ |
| OK | AUTO SHUTDOWN | Enabled | Disabled | N/A | Disabled | N/A | ⋮ |
| OK | REMOTE SHUTDOWN | Enabled | Disabled | N/A | Disabled | N/A | ⋮ |
| OK | SYSTEM RESET | Enabled | Disabled | N/A | Disabled | N/A | ⋮ |
| OK | MOTOR OVERLOAD | Enabled | Disabled | N/A | Disabled | N/A | ⋮ |
| OK | SYSTEM ALERT | Enabled | Disabled | N/A | Disabled | N/A | ⋮ |

History

Alert trigger history

| Id | Alert Type ⇅ | Alert Status ⇅ | Status ⇅ | Time Stamp ⇅ |
|---|---|---|---|---|

FIG. 6

SMART COMPACTOR CONTROLLER

BACKGROUND

Technical Field of the Invention

The invention is directed to the field of trash compaction and baler controllers including controllers with wireless communication capabilities.

Description of the Related Art

Industrial compactors and augurs are widely used in waste management to compress materials, reducing volume and facilitating disposal or recycling. Traditional equipment relies on manual inspections or basic sensors to detect fullness or malfunctions, often requiring on-site service calls that result in downtime and increased operational costs. Existing systems lack advanced diagnostic capabilities and predictive maintenance features, leading to unexpected failures of motors, hydraulic systems, or other critical components.

Waste Industry haulers typically own thousands of compactors and balers and rent the equipment to large commercial customers such as factories, warehouses, and restaurants, among other possible end users. The hydraulic power units that run the compactors and balers are similar, and the main components typically include a 10 HP motor, a 12 gal/min pump, a directional valve, tank, and an electrical control panel consisting of but not limited to; a transformer, motor starter and electrical buttons. Currently controller options are limited with each hydraulic power unit typically being set up with a single program to run one type of compactor and/or baler with the features that are on that particular equipment. Examples include oil heater, cart tipper, and photo sensor.

Compactors are frequently brought back to a hauler's facility for maintenance and refurbishment of the unit for many reasons including the end of a contract. Once a unit is repaired or refurbished it usually remains in the hauler's yard until another customer has a similar feature set-up so the programs will work for the new application. A new customer location would have to be a similar set-up with the same required features so the pre-installed programmed logic controller ("PLC") and capacity input/output ("I/O") setup will work with the new equipment. Otherwise, a new programmable logic controller, and significant wiring modifications may be required for the power unit to work properly.

Current state of the art systems used to monitor or perform diagnostics on compactors are installed by adding a separate, additional, panel to the power unit. This panel requires power to be run and new wiring connections to the power unit components like the motor and power unit electrical panel. Whether for a new installation or the retrofitting of an existing unit, it usually requires the rewiring of any I/O (input/output) that is to be monitored as well as adding additional components to measure pressure readings for monitor fullness. Pressure readings can be obtained from a pressure transducer in the compactor.

State of the art compactors that employ wireless communications are set up for one way communication only and communication is done via cellular antenna. For waste haulers that are looking to perform diagnostics for their entire fleet of compactors, cellular requires an expensive monthly charge and the capability of two-way communication is unavailable.

The hauler's contract agreement for handling the waste removal service includes a monthly compactor equipment rental fee along with a flat fee for a scheduled dumping charge. An additional fee may be assessed for call-in requests or as needed dumping of the compactor. With transport weight limits, additional charges would apply if the container, including trash tonnage, exceeds certain regulatory limits with potential fines added to a customer's bill in a situation when the weight is beyond legal limits and the hauler is issued a citation. The hauler, who typically owns and maintains the compactor equipment, thus has a strong desire to avoid unnecessary service calls as well as identify non-compliant and abusive use of the equipment.

A commercial customer typically must call and notify the waste hauler that a compactor or baler is having an issue and is not working properly. The waste hauler then must dispatch a service technician who will usually respond to the unit on the same day or the following day. The dispatcher does not currently have the ability to dial into a unit to diagnose issues remotely and determine if the issue is minor, like a stop button, a safety switch set in an "off" position or that the compactor is full, resulting in the unit's inability to operate, or if there is a more difficult mechanical/electrical issue.

The dispatcher is not able to perform remote diagnostics to evaluate if a prior issue is still recurring or what potentially is the issue, so the technician cannot ensure they are prepared and equipped with the proper for the maintenance/ repair of the unit, resulting in a subsequent trip to obtain the additional/proper parts required to perform an adequate repair.

If a compactor is currently receiving violations for overloading, the current solution is to dispatch a technician to reset and lower the pressure settings. Reducing the pressure settings is an adjustment resulting in less tonnage being compressed, "full" loads weighing less and the hauler not incurring a penalty for a non-compliant load. Often a technician can be required to make numerous site visits for the adjustments of pressure settings for optimal compliant weight limits.

The Waste hauler thus has limited information to establish a preventive maintenance program in addition to a viable parts warranty tracking component with the existing equipment/parts in the field. There are two commonly used methods in determining the need for preventative maintenance to compactor equipment. First, is the number of completed hauls. When it exceeds a given amount, then the equipment is scheduled for maintenance and secondly, the calendar method, in which the equipment is serviced upon a pre-determined date without consideration of equipment usage times.

If a customer is in arrears, the hauler currently has the option to dispatch a service technician to turn off the power to the equipment, disabling the unit or the hauler will opt to remove the compactor from site. Furthermore, several hauler customers will have numerous compactors on their facility. For example, in an airport or shopping mall. A technician dispatched for service is often required to first check in with a customer contact to identify the location of the compactor with an issue which further drives up costs and usurps critical time.

There is a need for a smart, universal system capable of controlling the operation of the equipment, monitoring compactor status, remote diagnostics, and an Intelligent preventative maintenance program to enhance reliability, predictability and efficiency.

SUMMARY DISCLOSURE OF THE INVENTION

The present invention relates to industrial compactors and augurs, and specifically to a power control unit integrated with a universal AI-driven program for real-time operations, monitoring, diagnostics, remote troubleshooting, and predictive maintenance.

A smart controller for a waste compactor is disclosed which includes a computer device including a display interface, a sensor array including a load sensor, a vibration sensor, a temperature sensor, and a pressure sensor, a communications module configured for wireless connectivity, wherein the smart controller is configured to monitor fullness of the waste compactor, and the smart controller is configured for diagnostics monitoring including temperature, motor strain and hydraulic leaks.

Command/control of the power unit for industrial compactors is also disclosed, featuring an integrated universal artificial intelligence (AI) program that uses machine learning for optimization. The system performs all functions of operating a compactor including monitoring compactor fullness, diagnosing operational issues, internal warranty tracking calendar and AI replacement predictability in addition to end-user remote troubleshooting to minimize service calls. The AI algorithms analyze operational data to predict motor and component failures, schedules preventative maintenance, tracking and alert notification of warranty compliance and the optimization of compactor performance, thereby improving efficiency and reducing downtime to industrial waste management systems.

The invention provides a controlling power unit for industrial compactors equipped with a universal AI program. A smart board will perform command/control of the power unit which includes sensors to monitor fullness levels, motor performance, hydraulic pressure, and other operational parameters. The AI program processes this data to diagnose issues, perform remote troubleshooting, and execute algorithms that predict component failures and schedules preventative maintenance and warranty replacement compliance. By reducing the need for physical service interventions and optimizing compactor uptime, the invention addresses inefficiencies in existing industrial compaction systems.

Other features and aspects will be apparent from the following detailed description, the drawings, and the claims.

BRIEF DESCRIPTION OF THE DRAWINGS

Figure 3:
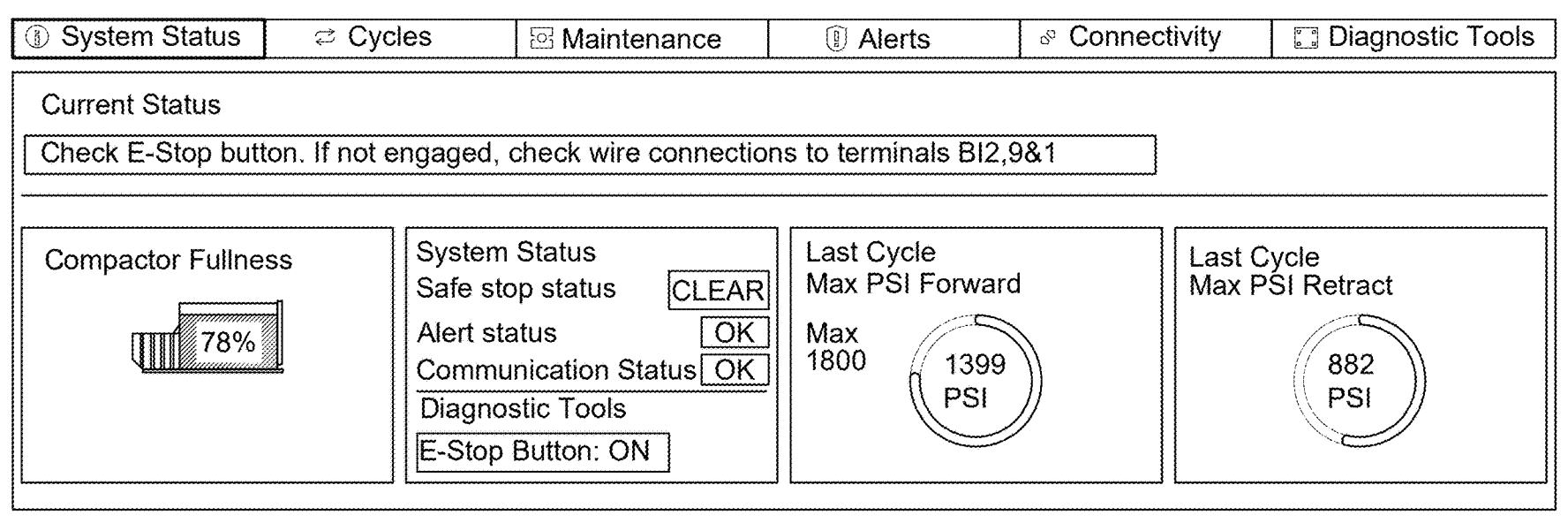

FIG. 3 shows a screen shot of a smart board interface.

FIG. 6 shows another screen shot of a smart board interface.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DISCLOSURE OF THE INVENTION

Figure 1:
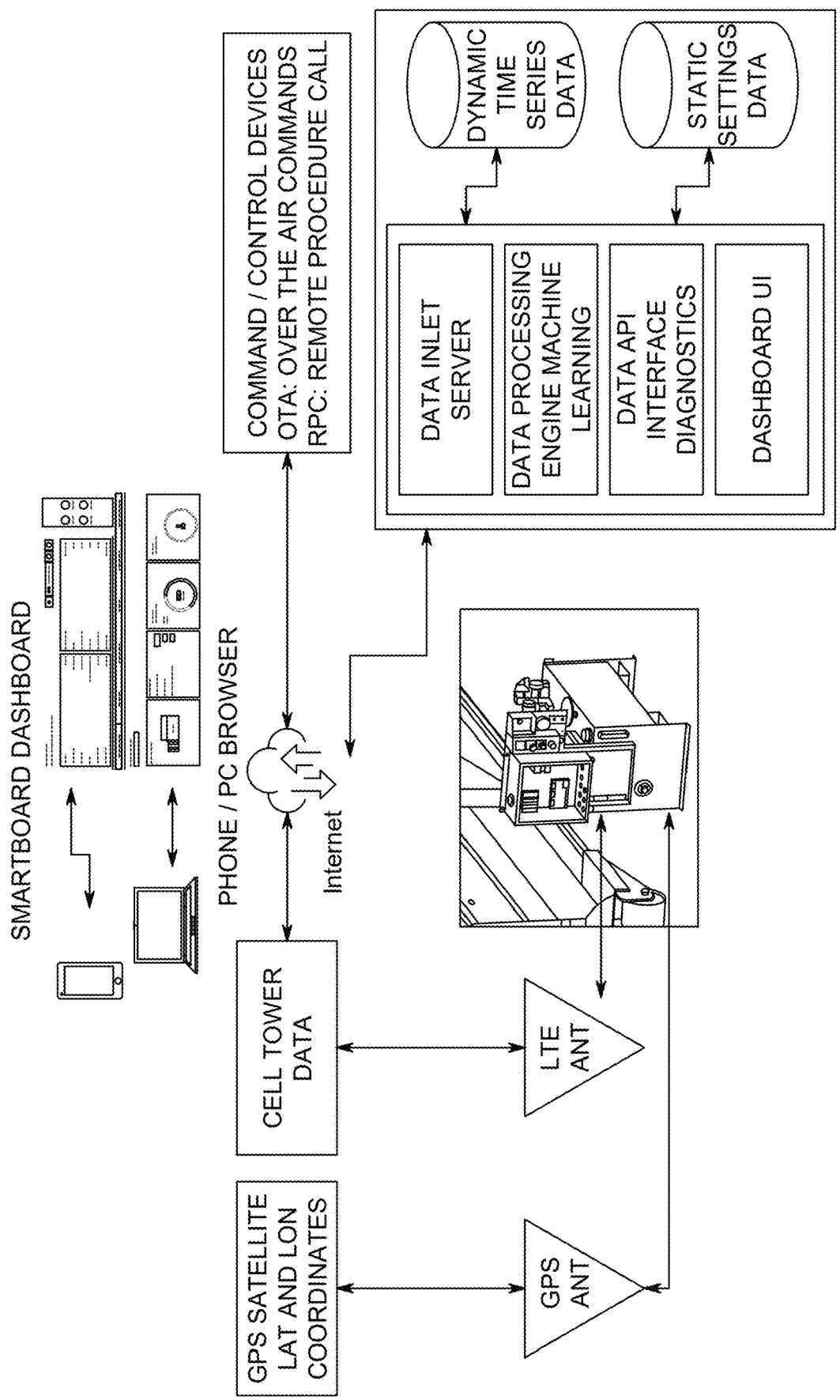
FIG. 1 shows a smart controller of the disclosure including Internet connectivity.

The following detailed description is provided to assist the reader in gaining a comprehensive understanding of the methods, products, and/or systems described herein. However, various changes, modifications, and equivalents of the methods, products, and/or systems described herein will be apparent to an ordinary skilled artisan.

A Smart Board power unit comprises the following key components.

Hardware Component: A computer device with a display (e.g., LCD or touchscreen) and input controls (e.g., buttons, keyboard), connected to the power unit and equipped with computing capabilities to run AI program with machine learning. Sensor Array: Includes, but is not limited to: Load sensors to measure material fullness; Vibration sensors to detect motor or mechanical irregularities; Temperature sensors to monitor overheating risks in motors or hydraulic systems. Level sensors to measure potential leaks, contamination, damaged components; Pressure sensors for hydraulic system diagnostics.

A computer device as used herein can include a bus, a processor, a system memory, a read-only memory, a permanent storage device, and input and output devices. The computer system can also include a display and a graphic processing unit (GPU).

A computer device can also include a smartphone, a tablet computer, a smart watch, or other wearable, or the like, a notebook or laptop computer and other portable computing devices or a desktop computer.

Communication Module: Enables wireless connectivity (e.g., Wi-Fi, cellular, or IoT protocols) for real-time data transmission to a remote server or computer device operator interface.

Universal AI Program: A software platform hosted within the unit via green board or PLC and/or on a cloud-based server, featuring: Command/control of all brands of OEM equipment along with all added feature(s) including photo eye automation, cart tipper, card reader, oil heater, along with other options.

Fullness Monitoring: Analyzes sensor data to determine compactor capacity and alert operators when full-ness thresholds have been met.

Diagnostics monitoring: Identifies operational anomalies (e.g., motor strain, hydraulic leaks) by comparing real-time data against baseline performance metrics.

Remote Troubleshooting: Provides step-by-step resolution protocols for identified issues that are interfering with safe start, accessible via a user interface, reducing the need for on-site service.

Predictive Maintenance Algorithms: Utilizes machine learning to analyze historical and real-time data, predicting component wear (e.g., motor bearings, hydraulic seals) and scheduling maintenance before failures occur.

Upon activation, the power unit initializes the universal AI program and confirms all input connection along with communication smart board controller. The AI continuously monitors compactor performance, logging data such as run/cycle frequency, oil temp/level, amperage load, vibration sensor, and hydraulic pressure. When an anomaly is detected (e.g., excessive vibration 20% greater baseline level), an alert is texted/emailed to review the diagnostic results including temp/pressure/amperage levels, to review potential causes and remote troubleshooting steps. Simultaneously, the predictive maintenance module evaluates motor run time and cycle count times against thresholds vs alerts for when preventative maintenance should occur, such as oil change or part replacement, before a breakdown occurs.

The system reduces operational downtime by minimizing unnecessary service calls through remote diagnostics. Extends compactor lifespan via predictive maintenance, preventing catastrophic failures. Universal design allows compatibility with various compactor models and manufacturers and enhances efficiency by optimizing emptying schedules based on real-time fullness data.

The smart board power unit with a universal AI program with machine learning represents a significant advancement in industrial compactor technology, offering a scalable, intelligent solution for operating, monitoring, diagnostics, and maintenance. While the preferred embodiment is described, modifications and variations within the scope of the invention will be apparent to those skilled in the art.

The Smart Board power unit for an industrial compactor includes a command/control operation, sensor array, a communication module, and universal AI program configured to monitor fullness and diagnose operational issues. The AI program performs remote troubleshooting to identify issues interfering with safe start of equipment without on-site intervention. The AI program employs predictive algorithms to identify motor usage with threshold usage including motor run time, i.e., 2200 hours or unit cycles above 10,000 that is adjusted based on component failures and schedule preventative maintenance.

The sensor array includes load, vibration, temperature, and pressure sensors and measures variances of baseline thresholds to evaluate component performance, warranty claims to refine quality of the power unit.

In embodiments, a universal smart controller with optional power supply is provided to run any original equipment manufacturer (OEM) brand of self-contained and/or stationary compactor along with all standard options. The controller programming includes all add on features including oil heater, photo eye, tipper unit, warnings, driver control along with any other required feature. Additional programs can be included, and a user can toggle between various options including Vert-I-Pack (VIP) machine, Pre-crusher, and Baler, such that a single controller/power unit can run any equipment.

A programmable logic controller (PLC) design with a layered PCB board and human machine interface (HMI) for a user friendly interface to set times/controls/pressures. All (up to 14) in/(up to 12) out connections can be remotely monitored to diagnose and troubleshoot to reduce the need to dispatch a technician and thus reduces carbon footprint. Communication may be via a long range wide area network (LoRaWAN) for the internet of things (IoT) which may be a secure network with minimum expense.

This improves the customer experience by having two-way communication reducing the cost to operate and with the ability to perform such tasks as remotely turning off a machine or adjusting pressures to modify load weight of the compactor to conform to legal requirements.

In embodiments, a programmable logic controller (PLC) with optional power supply with universal wiring is pre set-up with a plurality of Inputs and outputs to accommodate any additional required features that are required by a customer. In an embodiment there can be up to 12 inputs and up to 14 outputs. The wiring set-up thus only requires hooking up a new feature to existing features.

In embodiments, a microprocessor is loaded with up to 4 firmware programs to run any compacting or baler equipment including self-contained/stationary compactors, VIP compactors, Pre-crusher compactors and Balers. This improves efficiency and reduces operating costs by a user not needing to purchase additional power units since each unit can be easily placed with any application. In addition, the hauler will be able to improve service levels to its customer base by simply using a unit from the repair yard versus waiting for a supplier to deliver a new unit.

Given this invention is the brains that operates all the compactor and baler units in the Haulers' fleet, the conversion of an existing power unit to this new technology is very efficient. The hauler simply needs to install the new microprocessor and universal wiring to retrofit this smart technology to a current (dumb) system. In addition, all diagnostics and/or monitoring is achieved simultaneously.

The primary communication set-up would be a reliable low voltage radio signal such as a LoRaWan network for reliability and cost savings. Data can be pulled from the unit at any desired frequency, for instance every two minutes or every hour, or once a day, and the administrator can adjust in an alert situation to every second to get real-time results to evaluate the unit and determine the issue. In addition, a cellular antenna may be included to provide for back-up communication if a low voltage option is not available.

A waste hauler thus can actively communicate with the equipment in real time when a service issue has been reported. The hauler will be able to confirm the status of the inputs/outputs and pressures to determine if any potential irregularities exist, such as a stop button pushed in, safety switch not engaged, or hoses not connected, that will potentially solve an issue.

Another potential issue that can be identified would be when a compactor is full and needs to be dumped which can be done by viewing pressure history. In this case, a dispatcher with the hauler could simply dispatch a roll-off truck to pick up and dump the compactor versus sending a technician. By reviewing pressure history, real time data and alerts, a hauler can also evaluate potential issues that could be the cause of a compactor problem and alert the technician, so the technician can be better prepared with cylinders and/or the correct replacement parts to make the repair in one trip.

An important feature of the invention is to provide for cost efficient two-way communication that allows for many tasks that currently require an on-site technician to complete, to now be completed remotely. For instance, pressure settings can be adjusted remotely to modify the tonnage of the trash to be compressed before requesting the compactor be dumped. In situations where storms cause power outages that could erase programs running the compactor, the program can be re-installed remotely and avoid having to dispatch a technician. In addition, the power unit can be turned on or off remotely so there will no longer be a need to send a technician when end user is in arrears in their payments and the power unit needs to be disabled.

With this invention a preventive maintenance program can be established based on actual usage of the compactor. The hauler can determine number of cycles and/or operating time to alert them that a compactor unit needs to be scheduled for maintenance.

The invention also allows for GPS tracking that allows for several benefits to the hauler. It will guide the technician directly to the troubled unit when the customer site could have multiple units spread over a large area. In addition, a GPS tracker is an anti-theft tool. Haulers frequently face the issue of independent competitors taking equipment, having it repainted, and claiming it as their own.

All the data gathered from the invention is stored into a structured query language (SQL) database. An application programming interface (API) links to the information to allow the hauler to easily integrate this data to their Enterprise Resource Planning (ERP) and/or Customer Relationship Management (CRM) systems to improve their operations. For instance, preventive maintenance alerts can be integrated. The device can also be installed on new power units. Such units could go to either the Original Equipment Manufacturer (OEM) and/or to a Hauler. The invention also provides retrofit applications where a microprocessor and wiring system is sold to a hauler to convert a legacy (dumb) unit to a new smart unit. In embodiments, the controller may be configured to be used with any existing original manufacturer equipment. In embodiments, the disclosed controller may be provided with a power supply.

In embodiments, the controller can operate via timing and/or pressure, or limit switches controlled with a printed circuit board microcontroller. The microcontroller can be programmed with all options necessary for the power unit including lighting and alarms to meet ANSI standards for photo eye multi cycle door loading, oil level and heater, cart tipper operation, driver and pendant controls, multi-user and billback, and other features. Cart tipper operation is control of an attached or integrated cart or compactor tipper of the waste compactor. Lighting data and control would be control of lighting attached to, or in the immediate vicinity of the compactor. Container away and return is monitoring the container's position and placement and when it has been removed from its place or position and when it has been returned.

The controller can perform remote diagnostics and monitoring of up to 14 inputs for maintenance troubleshooting and alerts. The controller can monitor fullness of the compactor and provide alerts via transducer. The controller can manage preventative maintenance programs of the compactor based on hours of use and/or or count of cycles of operation. The controller has Bluetooth and a Wi-Fi capability which can be used to program settings and features of the microcontroller from a mobile device, e.g., smartphone, smartwatch or other wearable, tablet computer, laptop, or desktop computer.

The controller can include a non-payment remote kill switch for the Compactor or baler power unit. The controller can be reprogrammable. The controller can operate, monitor fullness and perform diagnostics on embedded base equipment. Microcontroller data can be stored polled in a required time sequence into a cloud database and formatted as needed.

The controller can be cloud based, provide auto service alerts for fullness monitoring, dispatching of service personnel, provide remote access to a compactors controller, include a combined power unit, and can be retrofitted to operate on existing OEM equipment.

FIG. 1 shows a smart board dashboard of the disclosure. FIG. 1 shows a smartphone and/or PC browser dashboard which includes features such as device details and real-time status of a compactor. The dashboard shows compactor fullness, system status, and last cycle information. FIG. 1 further shows Internet connectivity of the system.

Figure 2:
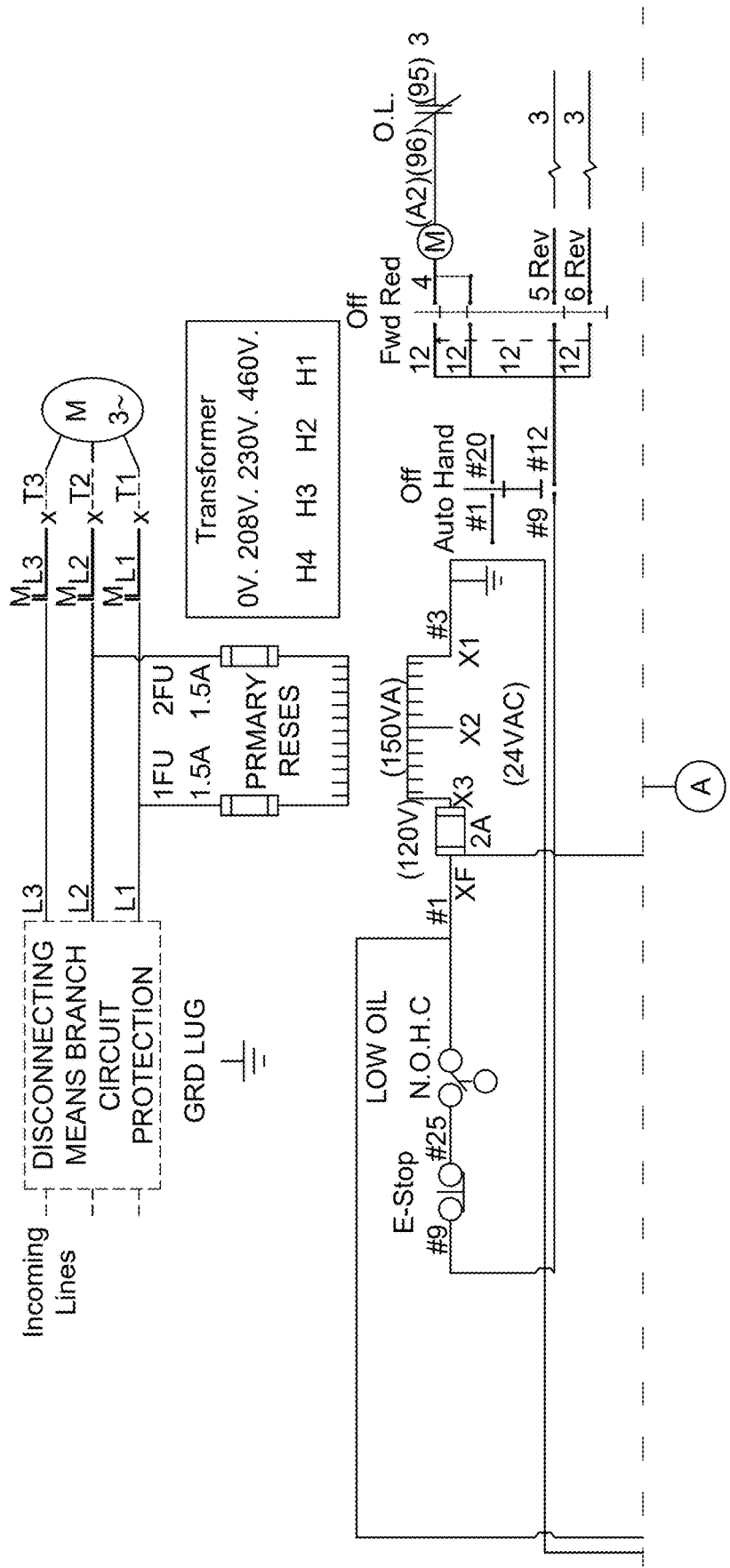
FIG. 2 shows an embodiment of a circuit diagram of a smart board of the disclosure.
Figure 2:
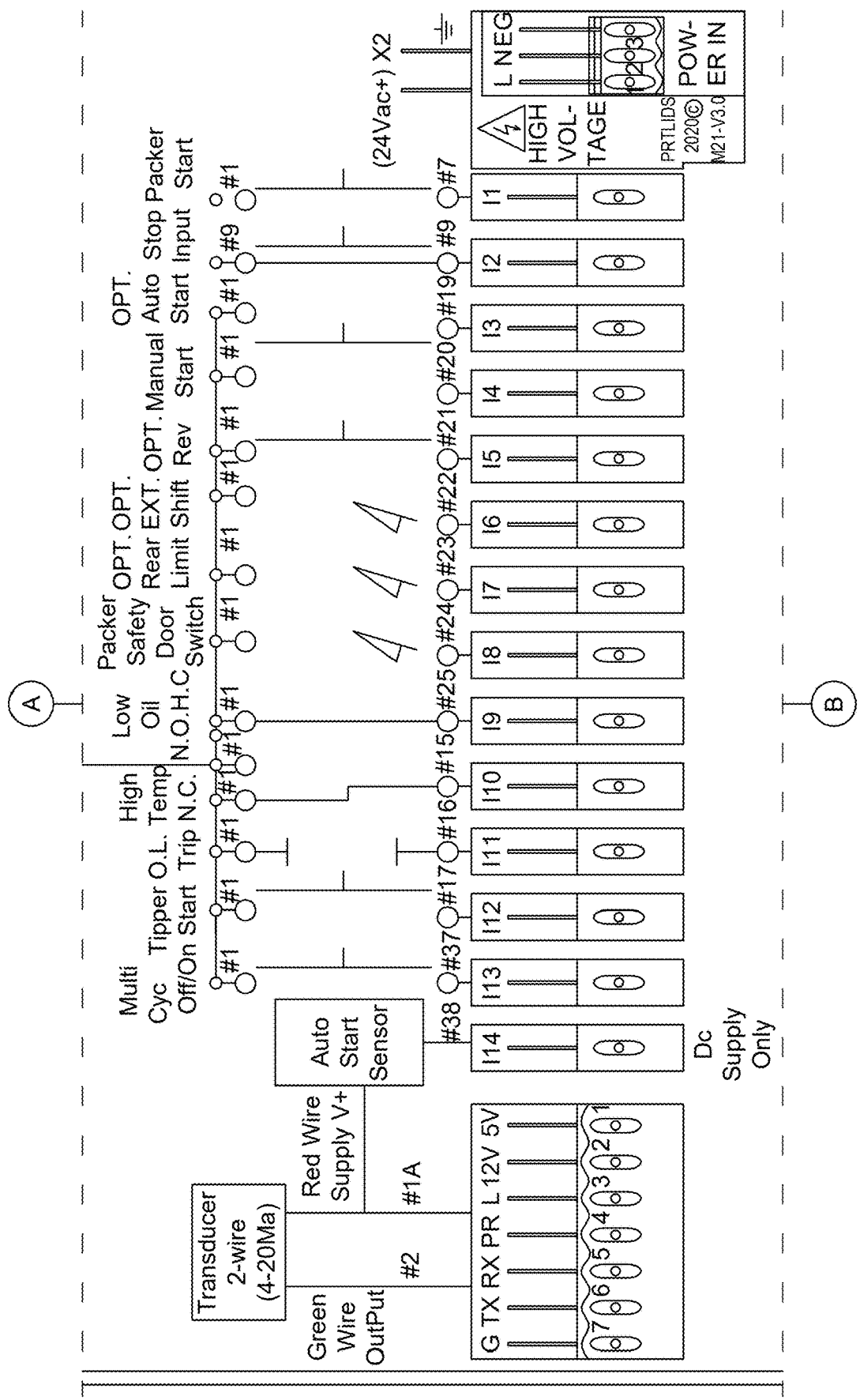
Figure 2:
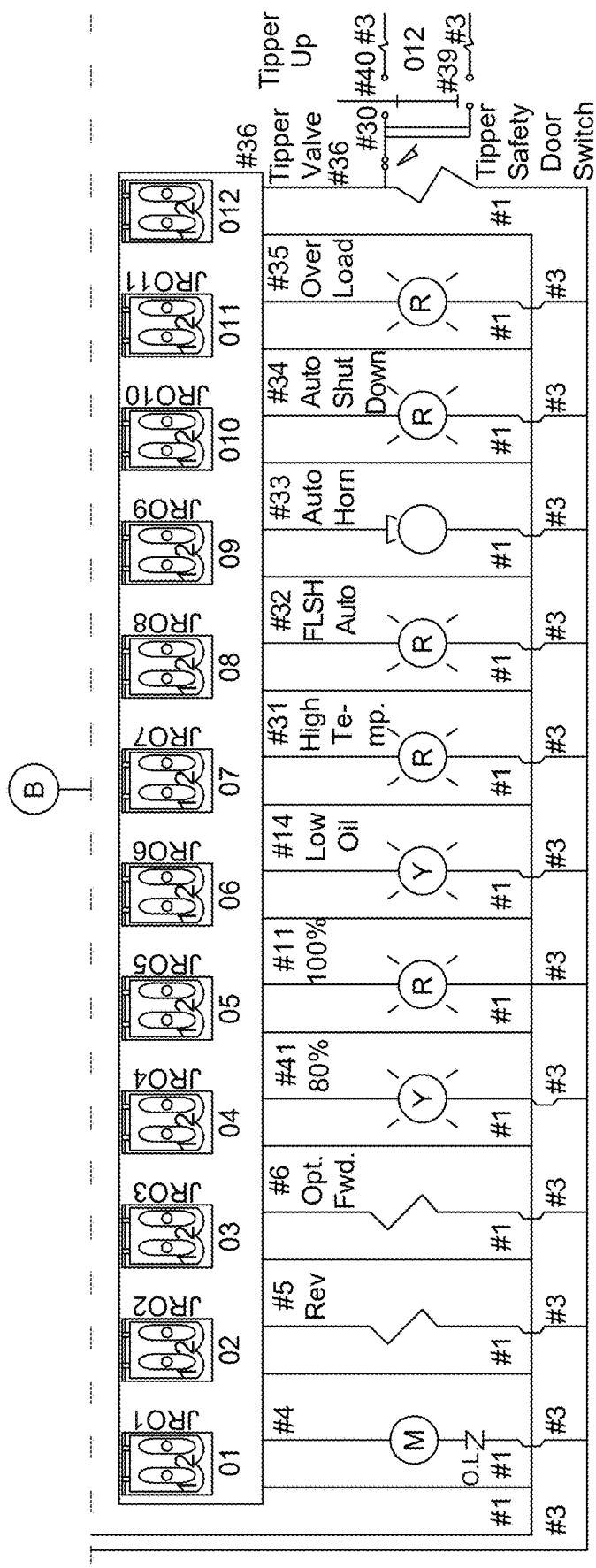
Figure 4:
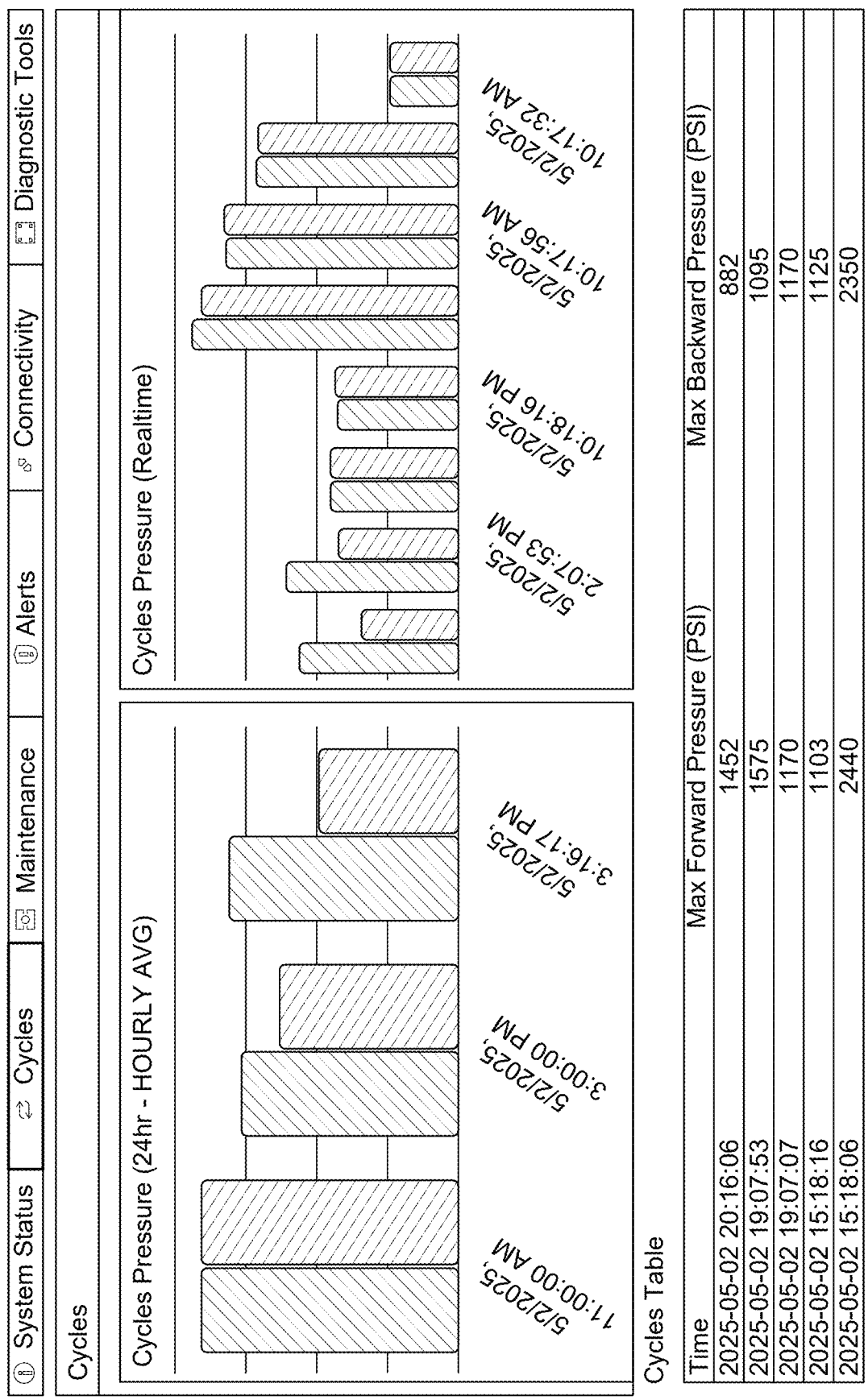
FIG. 4 shows another screen shot of a smart board interface.
Figure 5:
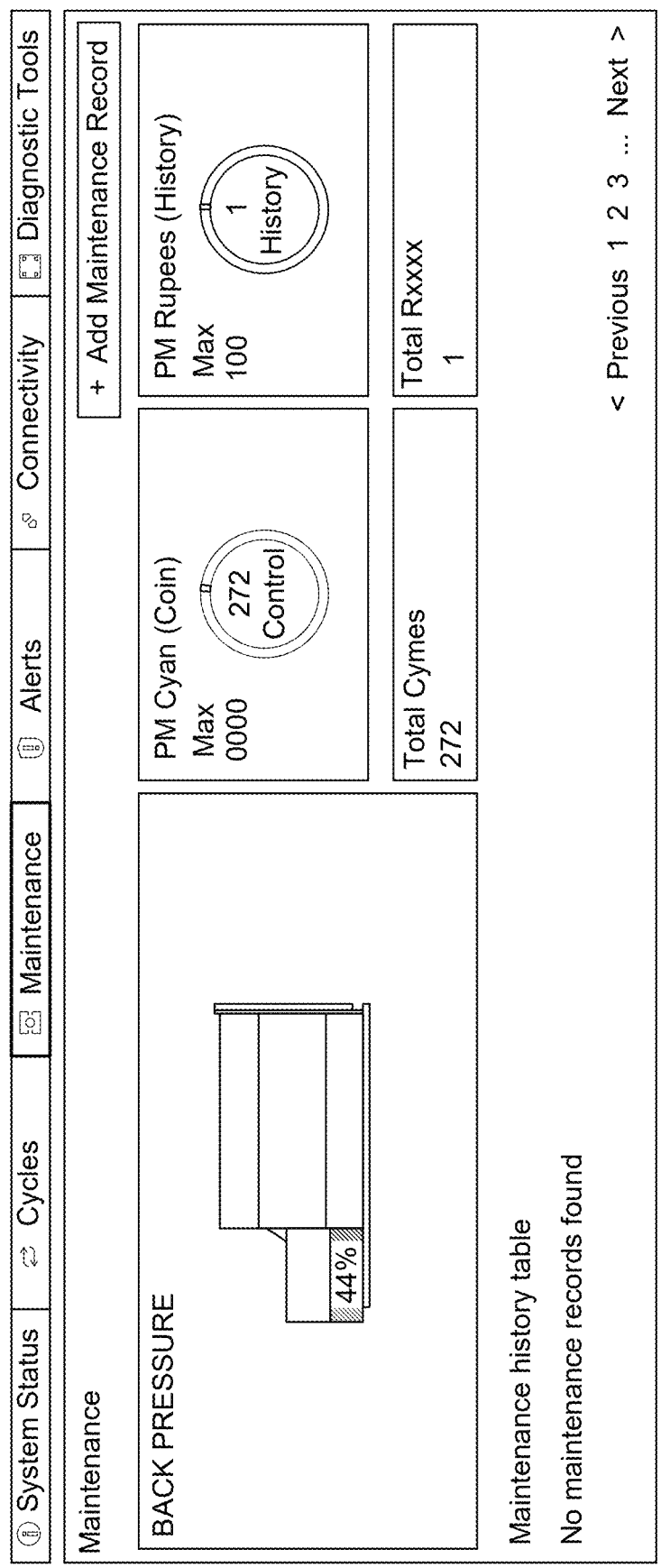
FIG. 5 shows another screen shot of a smart board interface.
Figure 7:
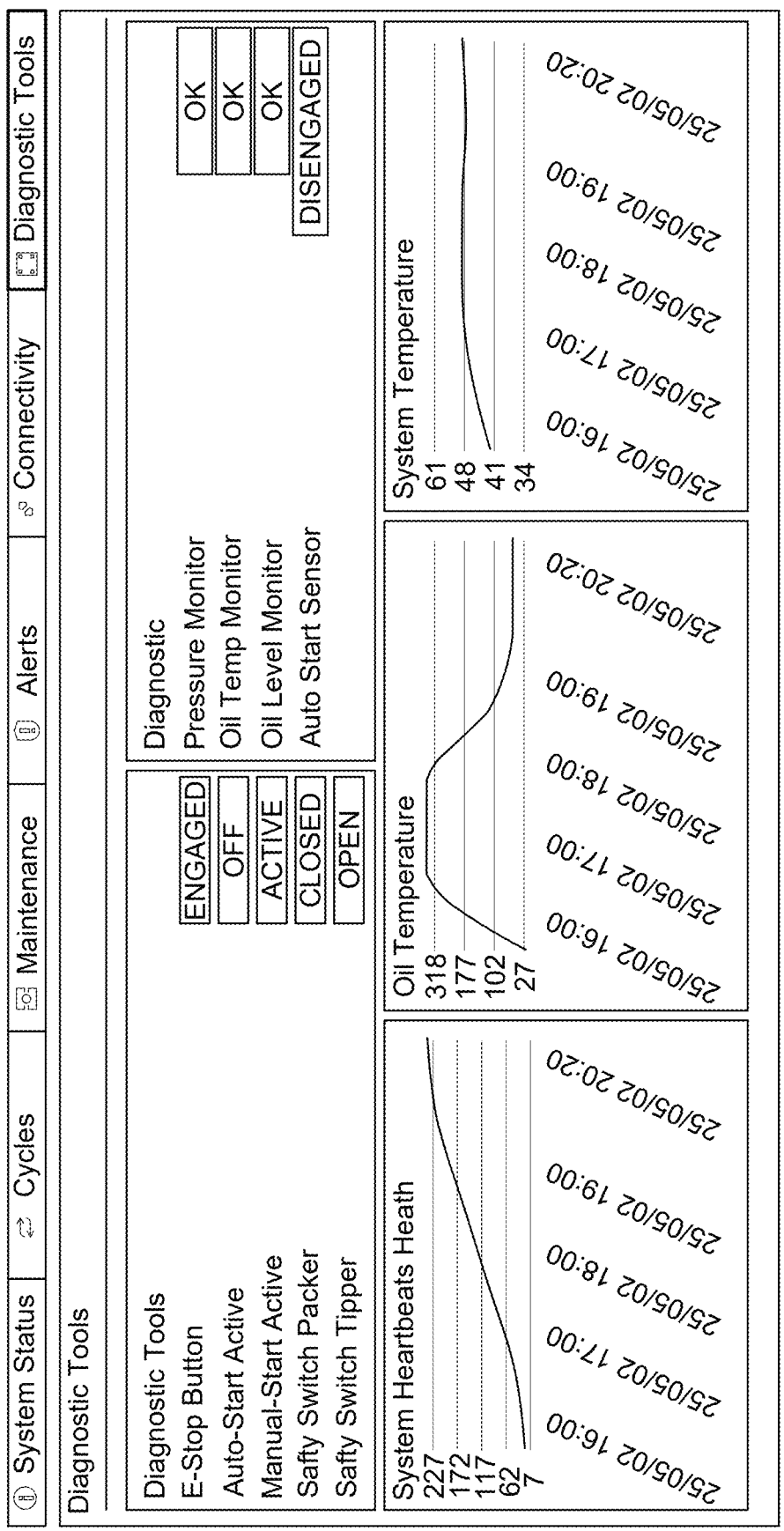
FIG. 7 shows another screen shot of a smart board interface.

FIG. 2 shows an exemplary circuit diagram of a controller board of the disclosure.

Waste compactors are used for compaction of garbage and other trash or waste materials. Waste compactors usually include a trash or waste container optionally including a hopper, a hydraulic ram to effect compacting strokes for compacting the waste placed in the hopper of a container, and a hydraulic pump for advancing and retracting the ram such that the hydraulic pressure is capable of being monitored between the pump and the ram.

A commercial compactor is generally a hydraulic system for compacting waste placed within a container and a hydraulic pump for applying hydraulic pressure to advance and retract the ram during compacting. A power pack comprises electrical and hydraulic system components of the compactor. Each system can include a microprocessor-based controller/monitor which can communicate its status via wireless, SMS text message, cellular, WiFi, GSM, GPRS or any currently used mode of Internet, VOIP, Ethernet, network or wired form of communication. A circuit board containing a microprocessor controls the operation of the compactor. Based on historical data and pressure calculations and the pressure values from the pressure transducer, in addition to controlling the operation of the compactor, the system monitors such operation and can originate and send messages regarding the operation and/or need for maintenance of the system. For example, as discussed above, if the sensed pressure value exceeds the calculated maximum pressure value, the system can make a pick-up request or communicate other information regarding operation or maintenance of the system. The system can be adjusted to the particular characteristics of the model of compactor.

EXAMPLE

An industrial compactor equipped with a smart board power unit operates 24/7. The AI program detects motor run time and/or cycle counts that exceed threshold that prompt scheduling a preventive maintenance on the equipment. The program will initiate an alert on the dashboard and app to schedule service and once completed will reset motor run time and cycle count to zero. Average motor amperage draws increases 20% over average baseline level over a two-week period, the motor vibration data is also elevated. The smart board alerts via a mobile app, recommending a motor inspection within 30 days if readings continue. Simultaneously, fullness pressure sensor indicates the 80% level of capacity was reached with 3 consecutive cycles, initiating a text/email to dispatch to schedule emptying. Based on the weight ticket of load, operator can adjust pressure sensor and/or consecutive cycle count remotely in order to minimize the pulls which in the past required a service technician visit. The end user is not able to run the compactor unit but a remote review of the smart board via the app detects the safety switch is not engaged restricting the compactor from running. The issue is resolved remotely by instructing the end user to close door that engages the switch, avoiding a service visit.

While this disclosure includes specific examples, it will be apparent after an understanding of the disclosure of this application has been attained that various changes in form and details may be made in these examples without departing from the spirit and scope of the claims and their equivalents.

The invention claimed is:

1. A smart controller for remote diagnostics, monitoring, troubleshooting, and control of a waste compactor comprising:
  a computer device including a display interface and a microprocessor loaded with 1 to 4 firmware programs configured to interface with and control multiple, pre-existing, original equipment manufacturer (OEM) waste compactor types;
  a sensor array including a load sensor configured to measure material fullness, a vibration sensor configured to detect motor irregularities, a temperature sensor configured to monitor for overheating, and a pressure sensor configured for hydraulic system diagnostics;
  a communications module configured for two-way wireless connectivity using at least one of a long-range wide area network (LoRaWAN) or Bluetooth technology, wherein the microprocessor, executing the 1 to 4 firmware programs, is configured to:

monitor fullness of the waste compactor in real-time by analyzing data from the sensor array to determine when a fullness threshold is reached and transmit an alert via the communications module to a remote device;

perform diagnostics monitoring by analyzing real-time and historical data from the sensor array to detect operational anomalies including excessive temperature, motor strain, and hydraulic oil leaks and to generate predictive maintenance alerts; and execute remote troubleshooting via the two-way wireless connectivity to resolve operational issues including controlling an on/off power switch and adjusting pressure settings of a hydraulic system.

2. The smart controller of claim 1, wherein the monitoring fullness, diagnostics monitoring and controlling is done with fullness monitoring and diagnostics monitoring using artificial intelligence (AI) machine learning algorithms to optimize waste compactor operation and predict maintenance needs.

3. The smart controller of claim 1, wherein the remote troubleshooting identifies any interference to starting operation of the waste compactor and the two-way wireless connectivity allows for correcting the issue.

4. The smart controller of claim 1, wherein the diagnostics monitoring further includes calculating motor run time and maintenance scheduling to prevent operational downtime.

5. A method of using the smart controller of claim 1 for remote control of a waste compactor further comprising a waste container, a hydraulic system for waste compaction, and a compactor microprocessor for operational control of the waste compactor, comprising:

data sampling the waste compactor with the smart controller at a predetermined frequency interval, wherein the data sampling includes hydraulic oil level, pressure transducer data, pressure transducer settings, and compactor fullness using the sensor array;

wirelessly transmitting the data to the smart controller via the communications module; remotely controlling operation of the waste compactor via the compactor microprocessor using the 1 to 4 firmware programs, wherein remote control operation of the waste compactor includes controlling the pressure transducer settings and the on/off power switch.

6. The method of claim 5, wherein the data further includes GPS location data of the trash compactor.

7. The method of claim 5, wherein the smart controller includes a power supply.

8. The method of claim 5, wherein the smart controller is programmable allowing the over the air flashing of 1-4 firmware programs to different OEM waste compactor configurations.

9. The method of claim 5, wherein the data sampling and diagnostics includes cart tipper, sonic sensor, or photo eye.

10. The method of claim 5, wherein the data sampling detects container away and return.

11. The method of claim 5, further including the step of retrofitting the compactor microcontroller onto a preexisting original equipment manufacturer (OEM) waste compactor to enable remote diagnostics, monitoring, and control via the 1-4 firmware programs, thereby extending the operational life of the OEM compactor.

* * * * *